United States Patent [19]

Schneider et al.

[11] Patent Number: 4,722,918
[45] Date of Patent: Feb. 2, 1988

[54] CATALYST FOR DECREASING THE CONTENT OF NITROGEN OXIDES IN FLUE GASES

[75] Inventors: Michael Schneider, Ottobrunn-Riemerling; Hans J. Wernicke, Geretsried; Karl Kochloefl, Bruckmühl/Heufeld; Gerd Maletz, Landshut, all of Fed. Rep. of Germany

[73] Assignee: Sud-Chemie Aktiengesellschaft, Munich, Fed. Rep. of Germany

[21] Appl. No.: 895,406

[22] Filed: Aug. 11, 1986

[30] Foreign Application Priority Data

Aug. 13, 1985 [DE] Fed. Rep. of Germany ....... 3529060
Sep. 10, 1985 [DE] Fed. Rep. of Germany ....... 3532226

[51] Int. Cl.$^4$ .......................... B01J 20/12; B01J 21/16
[52] U.S. Cl. ......................................... 502/81; 502/84
[58] Field of Search ............................ 502/83, 48, 81; 423/239

[56] References Cited

U.S. PATENT DOCUMENTS 3,962,135 6/1976 Alafandi ................................ 502/84

FOREIGN PATENT DOCUMENTS 2748471 6/1973 Fed. Rep. of Germany .
2458888 6/1975 Fed. Rep. of Germany .
2410175 9/1975 Fed. Rep. of Germany .
3438367 5/1985 Fed. Rep. of Germany .
93193 8/1978 Japan ..................................... 502/84

Primary Examiner—Carl F. Dees
Attorney, Agent, or Firm—Sprung Horn Kramer & Woods

[57] ABSTRACT

A catalyst for decreasing the content of nitrogen oxides in flue gases. The catalyst contains at least one of the metals titanium, zirconium, vanadium, tungsten, molybdenum, or cerium in the form of one or more of their oxides combined with a silicate with a three-layer structure (three-layer silicate). The three-layer silicate is acid-activated while essentially retaining its crystalline layer structure. The three-layer silicate has a cation-exchange capacity of 30 mvals/100 g or more before acid activation. The acid activation lowers the concentration of interlayer cations and increases the BET surface at least 15% and preferably at least 50% in terms of the BET surface of the three-layer silicate before acid activation. The atomic ratio of the silicon in the acid-activated three-layer silicate to the metal in the oxide is from 0.2 and 50 and preferably from 0.4 to 25.

18 Claims, 2 Drawing Figures

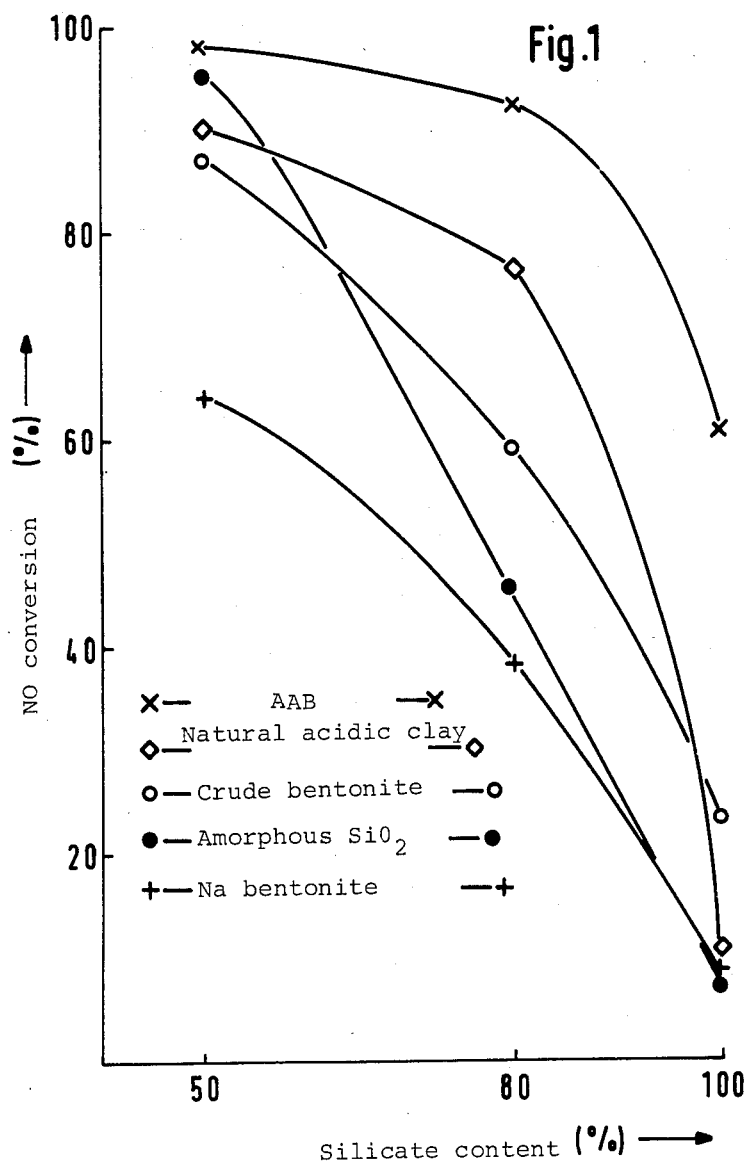

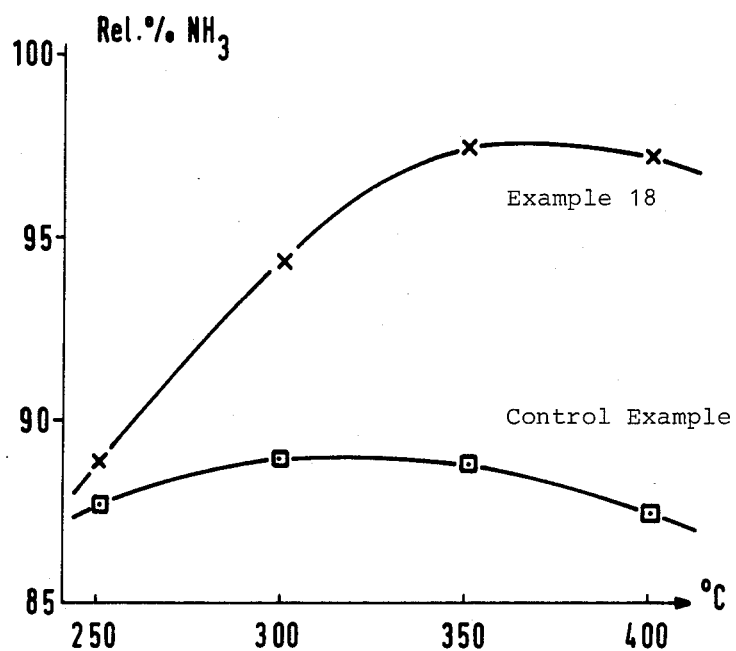
Fig. 2  NH₃ CONSUMED FOR NOₓ-REDUCTION

CATALYST FOR DECREASING THE CONTENT OF NITROGEN OXIDES IN FLUE GASES

BACKGROUND OF THE INVENTION

1. Field of the Invention

The invention concerns a catalyst for decreasing the content of nitrogen oxides in flue gases.

2. Background Information

Nitrogen oxides ($NO_x$) are generated both from the nitrogenous constituents of the fuel and from the nitrogen in the air when fossil fuels are burned. The oxides enter the atmosphere and become extremely detrimental to the environment.

It is known that nitrogen oxides can be converted into $N_2$ and $H_2O$ by $NH_3$ and that the reaction is fairly selective over a wide range of temperatures, meaning that, since it proceeds in the presence of a high excess of oxygen (as is usual in flue gases) without excessive loss of ammonia as the result of oxidation, only relatively small amounts of reductants are necessary. Various catalysts for reducing $NO_x$ with ammonia are also known.

German AS No. 2 410 175, for example, discloses catalysts of this type that consist of oxides of vanadium, molybdenum, and/or tungsten. The stoichiometry is $V_{12-x-y}Mo_xW_y$, wherein $0 \leq x \leq 8.0 \leq y \leq 5$ and $0.3 \leq (x+y) \leq 8$.

Furthermore, German Pat. No. 2 458 888 discloses a method of reductively decomposing nitrogen oxides in flue gases. A mixture of gases containing nitrogen oxides, molecular oxygen, and ammonia is contacted with a catalyst composition that contains (A) titanium in the form of oxides in an intimate mixture with (B) iron or vanadium in the form of oxides as its essential constituents.

The drawback to these catalysts is that the catalytically active constituents that they contain in the form of relatively expensive transition metals are exploited only to a low degree because they are not optimally distributed. Although the active constituents are extended by solid inert carriers, which does make them more economical, the dilution with inert material entails the risk of extensively decreasing their catalytic activity. Another drawback to these catalysts is that they also catalyze the $SO_2$ that is often contained in the flue gas into $SO_3$, which can lead for example to deposits of salts in the downstream equipment of the system.

German OS No. 3 438 367 also discloses a catalyst for decreasing the content of nitrogen oxide in flue gases by selective reduction. The catalyst consists of (A) 80 to 95% by weight of a catalytic oxide containing a sulfur oxide and is obtainable among other methods by heat treating an aqueous oxide compound of titanium or silicon, (B) 0 to 5% by weight of a catalytic oxide that contains vanadium oxide, and (C) 1 to 15% by weight of a catalytic oxide like tungsten oxide.

Considered essential to this catalyst is the formation of a solid acid composed of $SiO_2$ and $TiO_2$, its acidity modified by treatment with sulfuric acid or ammonium sulfate. The distribution of the solid acid is considered as representing the standard for controlling the adsorption of $NH_3$ at the surface of the catalyst and hence for improving its catalytic activity.

The $SiO_2$ is employed in the form of a silica sol. It is known that silica gels distinguished both by high BET surfaces and by high porosity can be obtained from $SiO_2$ sols, although the percentage of macropores is low, which has a deleterious effect on material transport and hence on catalytic activity.

German OS No. 2 748 471, finally, discloses a catalyst composition to be employed in the vapor-phase reduction of nitrogen oxides with ammonia, especially to reduce the content of nitrogen oxides in flue gases. This catalyst consists essentially of an oxide or sulfate of one of the metals copper, vanadium, chromium, molybdenum, tungsten, manganese, iron, or cerium on a shaped carrier that contains titanium oxide and a minor portion of a clay mineral with a mean particle size of 0.1 to 100 $\mu m$. Clay minerals like montmorillonite, kaolin, halloysite, pyrophillite, and sericite can be employed. These are aluminosilicates with a layered structure, some of them three-layer silicates. Up to 15% by weight of these clay minerals is claimed to increase only the stability of the catalyst. The additives have no significant effect on catalytic activity at these levels and larger amounts even have a negative effect in this respect. Due to their chemical composition, they also decrease the catalyst's resistance to flue gases that contain $SO_x$.

SUMMARY OF THE INVENTION

It has been discovered that specifically modified silicates with a three-layer structure that interact synergistically with other catalytic constituents can be employed to obtain catalysts of the aforesaid genus with improved activity. The latter catalysts can be employed in turn to extensively decrease the content of nitrogen oxide in flue gases, while simultaneously exploiting both the expensive oxidic constituents of the catalyst and the reductants and increasing its resistance to $SO_x$.

The object of the invention is accordingly to provide a catalyst for decreasing the content of nitrogen oxide in flue gases and containing at least one of the metals titanium, zirconium, vanadium, tungsten, molybdenum, or cerium in the form of one or more of their oxides combined with a silicate with a three-layer structure (three-layer silicate).

The catalyst is characterized in that (a) the three-layer silicate is acid-activated while partly retaining its crystalline layer structure, (b) the three-layer silicate has a cation-exchange capacity of 30 mvals/100 g or more before acid activation, (c) the acid activation lowers the concentration of interlayer cations and increases the BET surface at least 15% and preferably at least 50% in terms of the BET surface of the three-layer silicate before acid activation, and (d) the atomic ratio of the silicon in the acid-activated three-layer silicate to the metal(s) in the oxide(s) is from 0.2 and 50 and preferably from 0.4 to 25.

BRIEF DESCRIPTION OF THE DRAWINGS

FIG. 1 are plots of NO conversion vs. silicate content for AAB, natural acidic clay, crude bentonite, amorphous $SiO_2$ and Na bentonite.

FIG. 2 are plots of relative % $NH_3$ vs. temperature for Example 18 and a control Example.

DETAILED DESCRIPTION OF THE INVENTION

"Acid activation" of the three-layer silicate is to be understood in accordance with the invention as a treatment that extends beyond the replacement of the monovalent or divalent cations at the interlayer sites with ions of hydrogen. It has specifically been determined that three-layer silicates wherein only such ion exchange has occurred will not produce catalysts with a high enough activity. Furthermore, catalysts obtained with natural three-layer silicates in the hydrogen form do not have high enough activities and are not stable against $SO_x$. Similarly unsatisfactory are the natural and alkaline-activated three-layer silicates (since alkali metals poison the catalysts in question), the fuller's earths, and the natural acidic clays, the Japanese Niigata clays for example.

Acid activation most likely leads to the silicate layers being attacked from the edges and the ions being released from the octahedral layers. The remaining $SiO_4$ tetrahedral bands have a certain wedge action and steric hindrance, especially during drying, that disorients the layers, although the crystalline layer structure is essentially maintained. The result is a state intermediate between the crystalline structure of the three-layer silicate, either the original or the one already in the H form, and the completely destroyed crystalline structure of amorphous silicic acid.

Acid activation increases the specific surface area which is generally determined by the BET method. An appropriately high specific surface area remains even after the acid-activated layer silicate has been intimately mixed with the oxidic constituents of the catalyst, even when large amounts of them have been employed. Acid activation must not on the other hand be continued until only amorphous silicic acid remains because the synergistic interaction with the oxidic constituents of the catalyst will obviously cease at that point, as will be evident from a steep drop in catalytic activity at an increased content of silicic acid.

Another essential characteristic of the catalyst in accordance with the invention is a three-layer silicate with a cation-exchange capacity of at least 30 mvals/100 g before acid activation. Although the reason why especially active catalysts can be obtained with starting materials of this type has not been determined in detail, it can be ascribed to the particularly favorable crystalline structure of acid-activated three-layer silicates.

The acid-activated three-layer silicate enters into synergistic interaction with the metal oxides. Although no unambiguous mechanistic explanation of this synergism can be provided at the present, reorientation of the silicate layer structure by the acid activation would seem to be a prerequisite. Conversion with, for instance, a silica gel with a similar BET surface instead of the acid-activated three-layer silicates in accordance with the invention in conjunction with the oxidic metal constituents will result in a definite by lower catalytic activity.

The specific surface area of the acid-activated three-layer silicate employed in accordance with the invention is preferably between about 80 and 400 m²/g.

The acid activation preferably decreases the concentration of interlayer cations (especially sodium, potassium, magnesium, and calcium) in the catalyst in accordance with the invention at least 12% in terms of their concentration in the three-layer silicate before acid activation.

The acid activation initially removes the cations from the intermediate layersites. As acid activation continues, cations are also removed from lattice sites, disorienting the silicate structure. The acid attacks the silicate layers from the edges. Tetrahedral bands of $SiO_4$ probably occur and disorient the three-layer silicate due to a more or less wedging action, which apparently enables the oxidic catalyst constituents to enter into synergistic interaction with the acid-activated three-layer silicate.

The acidic decomposition is carried out until the $SiO_2$ content of the acid-activated three-layer silicate is at least 5% and preferably at least 10% higher than that of the starting material. Depending on the starting material, the $SiO_2$ content will then be 50 to 90 and preferably 65 to 80% by weight. Acidic decomposition is, however, not continued until only X-ray amorphous $SiO_2$ remains. It is discontinued at a specific degree of crystallinity on the part of the acid-activated three-layer silicate, i.e. when no more than 45% extractable silicate is present. The percentage of extractable silicate is determined by washing and drying the filter cake obtained in carrying out the acidic decomposition and treating it with a soda solution as described by Y. Otsubo, *Jap. J. Chem.*, 72, 573 (1951).

Macropores with a diameter of more than 80 nm will account for at least 25% of the total volume of pores. Pore volume is determined by mercury porosimetry.

The starting materials that contain the three-layer silicate can be acid activated in a way that is in itself known, preferably with aqueous mineral acids like hydrochloric or sulfuric acid. Organic acids like formic and acetic acid can, however, also be employed. The acid is employed in a concentration of from 1 to 60% by weight in terms of the solids content and preferably in the range of 10 to 40% by weight. Preliminary wet classification of the raw material can be practical. The acid-treated composition is washed with, if necessary, acidified water and filtered out.

The catalysts in accordance with the invention are also outstanding in their resistance to sulfur oxides and sulfuric acid as dictated by acid activation of the three-layer silicate. It has been confirmed that catalysts prepared with untreated, H-ion substituted or alkali-activated three-layer silicates are especially sensitive to sulfur oxides or sulfuric acid, leading to mechanical destruction and premature aging of the catalyst. This is probably also the result of the relatively high level of alkalis, which function as catalyst poisons.

Although, on the other hand, catalysts manufactured with amorphous silicic acid are resistant to sulfur oxides and sulfuric acid, their $NO_x$ activity is definitely poor.

An acid-activated three-layer silicate of the smectite type and especially of the montmorillonite type is preferred. The most important natural mineral that contains montmorillonite is bentonite, which can occur as calcium bentonite or sodium bentonite. Other minerals of the smectite type are hectorite and nontronite.

The starting compounds employed for the metal-oxide constituents of the catalyst in accordance with the invention are on the one hand the corresponding metal oxides and on the other the substances that can be converted into the metal oxides: the metals and hydroxides and especially salts, complex compounds, and/or oxygen acids or salts derived from the last. They can be employed if necessary in conjunction with an additive that functions as a reductant and/or complexing agent.

Cerium can for example be employed in the form of $Ce_2O_3$, $CeO_2$, $Ce(SO_4)_2$, and $Ce_2(C_2O_4)_3$. Appropriate starting materials for zirconium oxide are, in addition to the oxide hydrates, for example, the zirconium and zirconyl salts like $Zr(SO_4)_2$, $ZrCl_4$, $ZrOCl_2$, and $Zr(C_2O_4)_2$.

Appropriate starting substances for the tungsten constituents are, for example, tungsten oxides like $WO_3$, $W_{10}O_{29}$, $W_4O_{11}$, and $WO_2$ and mono- and polytungstic acids, heteropolyacids, tungstates, and tungstic halogenides and oxyhalogenides. Molybdenum compounds can also be employed instead of the analogous tungsten compounds.

Appropriate vanadium starting compounds include $V_2O_5$, $VO_2$, $V_2O_3$, and $VO$ along with ortho- and polyvanadic acids or vanadates, vanadium halogenides and oxyhalogenides like $VOCl_3$, for example, and various vanadium or vanadyl salts.

Appropriate titanium compounds are, in addition to the oxides and oxide hydrates, the titanium and titanyl salts, especially the halogenides and sulfates. Although titanyl sulfate is preferable from the economic point of view, metal-organic compounds like titanates, isopropyl titanate for example, can also be employed.

It has been discovered that especially practical results can be achieved when the metal oxides are individually present in the following ranges of concentration (by weight):

$TiO_2$: 10 –80%
$WO_3$ and/or $MoO_3$: 1–25%
$V_2O_5$: 0.1–25% and
$CeO_2$: 1–25%, with the acid-activated three-layer silicate accounting for the rest of the active constituents.

The metal oxides are present in the preferred catalysts in a binary or ternary combination.

When present in a binary combination, the metal oxides are present in a preferred catalyst in one of the following percentages by weight:

(a) ($TiO_2+V_2O_5$): 10–80,
(b) ($TiO_2+WO_3$ and/or $MoO_3$): 10–80,
(c) ($TiO_2+CeO_2$): 10–80,
(d) ($WO_3$ and/or $MoO_3+V_2O_5$): 5–25,
(e) ($CeO_2+V_2O_5$): 1–25, and
(f) ($ZrO_2+V_2O_5$): 1–25, with the acid-activated three-layer silicate accounting for the rest of the active constituents.

The ratios between the weights of the metal oxides present in a binary combination in a preferred catalyst are as follows:

(a) $V_2O_5:TiO_2=0.001-0.2$,
(b) $WO_3$ and/or $MoO_3: TiO_2=0.01-0.25$,
(c) $CeO_2:TiO_2=0.1-0.3$,
(d) $V_2O_5:WO_3$ and/or $MoO_3=0.1-2,5$,
(e) $V_2O_5:CeO_2=0.1-1.0$, and
(f) $V_2O_5:ZrO_2=0.1-1.0$.

When present in a ternary combination, the metal oxides are present in a preferred catalyst in one of the following percentages by weight:

(a) ($TiO_2+WO_3$ and/or $MoO_3+V_2O_5$): 10–80,
(b) ($TiO_2+CeO_2+V_2O_5$): 10–80,
(c) ($TiO_2+ZrO_2+V_2O_5$): 10–80,
(d) ($WO_3$ and/or $MoO_3+CeO_2+V_2O_5$): 10–25, and
(e) ($WO_3$ and/or $MoO_3+ZrO_2+V_2O_5$): 10–25, with the acid-activated three-layer silicate accounting for the rest of the active constituents.

The ratios between the weights of the metal oxides present in a ternary combination in a preferred catalyst are as follows:

(a) $WO_3$ and/or $MoO_3: TiO_2=0.1-0.25$
   $V_2O_5:TiO_2=0.01-0.11$,
(b) $CeO_2:TiO_2=0.05-0.23$,
   $V_2O_5:TiO_2=0.01-0.11$,
(c) $ZrO_2:TiO_2=0.01-0.24$
   $V_2O_5:TiO_2=0.01-0.11$,
(d) $CeO_2:WO_3$ and/or $MoO_3=0.1-5.0$,
   $V_2O_5:WO_3$ and/or $MoO_3=0.1-2,5$, and
(e) $V_2O_5:WO_3$ and/or $MoO_3=0.1-2,5$,
   $ZrO_2:WO_3$ and/or $MoO_3=0.1-10$.

The catalysts in accordance with the invention can be obtained, for example, by impregnating the acid-activated three-layer silicate with a solution containing one or more of the aforesaid metals in the form of salts and/or complex compounds and calcining it.

In another variant, the catalyst can be obtained by mechanically mixing the acid-activated three-layer silicate with an oxide or salt of one or more of the aforesaid metals (by grinding in a ball mill for example), impregnating the mixture, if necessary, with a solution containing one or more of the aforesaid metals in the form of salts and/or complex compounds, and calcining it.

The catalysts in accordance with the invention can also be obtained by precipitating or reprecipitating at least one compound containing one or more of the aforesaid metals in the presence of a suspension of the acid-activated three-layer silicate, washing out the foreign ions, and calcining.

The compound or compounds containing one or more of the aforesaid metals can also be precipitated or reprecipitated in the presence of a mixture of suspensions of the acid-activated three-layer silicate and of an oxide or salt of one or more of the aforesaid metals. This stage is followed by washing out the foreign ions and calcining.

The result of these procedures is an almost optimally intimate mixture of the oxidic metal constituents with the acid-activated three-layer silicate.

If the oxidic metal constituents consist of several metal oxides, the particular starting compounds can either be precipitated together or one after another in several stages, with the sequence of precipitation stages generally affecting the catalytic activity and needing to be optimized individually. It can of course turn out to be practical to impregnate the three-layer silicate, subsequent to one or more precipitation stages, if necessary, with a solution of a corresponding transition compound. Impregnation can occur either before or after shaping and calcining the catalyst.

The catalyst in accordance with the invention can also contain an inert carrier. The catalyst is usually present in the form of molded shapes, especially balls, tablets, extruded shapes, elongated or flat honeycombs (called "channel grids"), rods, tubes, rings, wagon wheels, or saddles.

The shapes can be obtained for example by tableting or extruding the catalyst composition, with additives also mixed in, if necessary, to facilitate shaping. Such additives include, for example, graphite and aluminum stearate. Additives to improve the surface structure can also be mixed in. These include, for example, organic substances that will burn up and leave a porous structure during the subsequent calcination.

It is not absolutely necessary to employ additives to facilitate shaping because the three-layer silicate that is employed as a starting material is plastically deformable even when intimately mixed with the metal constituents. Neutral bentonites or other binders like kaolin or cement can, however, also be added. The material is generally shaped with water or organic solvents like monovalent or polyvalent alcohols added.

The catalysts in accordance with the invention are usually dried after being shaped, and calcined at temperatures of about 200° C. to 700° C. and preferably 300° C. to 550° C. Inorganic fibrous materials can also be added before shaping to improve strength. Calcination activates the catalyst, which accordingly obtains its practical properties, especially if the aforesaid temperature ranges are maintained.

The examples hereinbelow specify typical procedures for manufacturing the catalysts in accordance with the invention.

Another object of the invention is the use of the catalysts in accordance with the invention for reductively decreasing the content of nitrogen oxide in flue gases that contain, in addition to the usual constituents, sulfur oxides ($SO_x$), whereby $NH_3$ is employed as a reductant.

In reducing with $NH_3$, the content of nitrogen oxides in the flue gases is decreased due to the formation of $N_2$ and $H_2O$. Although nitrogen oxides ($NO_x$) are any compound of nitrogen and oxygen like NO, $N_2O_3$, $NO_2$, and $N_2O_5$, the most important in the present context are NO and $NO_2$, mainly the former.

The concentration of $NO_x$ in the flue gases that are to be cleaned can vary widely, generally ranging from 100 ppm by volume to 5% by volume. The molar ratio of $NH_3$ to $NO_x$ is generally 0.3 to 3, preferably 0.6 to 1.5, and can be regulated by controls technology to obtain maximum $NO_x$ conversion at the minimum possible $NH_3$ slippage The $NH_3$ can be added either in the form of a gas or in an aqueous solution.

The catalysts in accordance with the invention are distinguished beyond known catalysts by a very extensively selective conversion of the ammonia that is preferred for reducing the nitrogen oxides. In conventional methods, especially at high operating temperatures, a considerable amount of the ammonia does not get consumed during the desired $NO_x$ removal, but oxidizes due to the oxygen present in the flue gas. This leads to additional nitrogen formation or decreases the conversion of $NO_x$ observed between the entrance into and exit from the reactor, leading to unnecessary consumption of $NH_3$.

Any of the reactors employed for heterogeneous catalyzed gas-phase reactions are appropriate for the $NO_x$ reduction if their design allows high volumetric flue-gas currents in relation to output. Permissible space velocities are in the range of 500 to 20,000 and preferably 1000 and 15,000 liters of gas per hour and liters of catalyst in terms of a gas at 0° C. and 1 bar. Space velocity will be designated as the dimension $h^{-1}$ in what follows for the sake of simplicity. Appropriate reaction temperatures range from approximately 200° C. to 600° C. and preferably 250° C. to 430° C. If the temperatures are much higher, the ammonia can oxidize due to the oxygen in the flue gas, removing the ammonia from the reaction along with the nitrogen oxides and allowing the degree of $NO_x$ reduction to drop. This undesirable effect, however, is not as powerful with the catalysts in accordance with the invention as with known catalysts.

Typical examples of the manufacture and use of the catalysts in accordance with the invention will now be specified.

The effectiveness of the catalysts with respect to eliminating nitrogen oxides from mixtures of gases that contain, among other substances, oxygen and sulfur oxides is determined by contacting the catalyst with a stream of gas flowing through a tube packed with the catalyst and electrically heated from outside. The mixture of gases is composed of $O_2$: 3% by volume $H_2O$: 10% by volume
$NO$: 750 ppm by volume
$NO_2$: 50 ppm by volume
$NH_3$: 800 ppm by volume
$SO_2$: 950 ppm by volume
$SO_3$: 50 ppm by volume and
$N_2$: to make up 100% by volume.

The concentration of NO and $NO_2$ in the mixture was measured before and after it traveled through the catalyst packing by an appropriated analyzer (chemoluminescence). The level of NO and $NO_2$ converted subsequent to establishment of a stationary state and as defined by the equations $$\text{NO conversion } (C_{NO}) = \frac{c_{NO}^E - c_{NO}^A}{c_{NO}^E} \times 100(\%)$$

and $$\text{NO}_2 \text{ conversion } (C_{NO2}) = \frac{c_{NO2}^E - c_{NO2}^A}{c_{NO2}^E} \times 100(\%)$$

was selected as the measure for the effectiveness of the catalysts in reducing the nitrogen oxides. $c_{NO}$ and $c_{NO2}$ represent the concentrations of NO and $NO_2$, and the superscripts E and A the state of the mixture of gases before and after traveling through the catalyst.

EXAMPLE 1

(a) 2 kg of a fraction of crude bentonite with a mean particle size of 50 μm, a cation-exchange capacity of 79 mvals/100 g, a BET surface of 69 m²/g, and the chemical composition listed in Table I, placed in an aqueous suspension by means of hydroclassification, are stirred into 8 l of an aqueous solution of HCl for 6 hours at 80° C. The HCl level is about 21% by weight of the dry substance. The material is suctioned off and the filter cake thoroughly washed with acidified water (pH adjusted to 3.5 with HCl). The resulting acid-activated bentonite ("AAB" hereinafter) has a BET surface of 210 m²/g. Its chemical composition is also listed in Table I. A decrease of 75% in the concentration of interlayer cations is calculated therefrom.

(b) 160 g of $TiOSO_4$ is added to a suspension of 320 g of the AAB obtained in step (a) in 5 l of water while simultaneously stirring, and neutralized by adding semiconcentrated ammonia. The solids are suctioned-off and washed free of sulfates. 10 ml of glycerol are added, and the paste extruded into billets 3 mm in diameter. The billets are calcined for 15 hours at 450° C.

The catalyst compositions specified in the subsequent examples are shaped, dried, and calcined in the same way.

Table II lists the composition of the catalysts, the reaction temperatures, and the NO and $NO_2$ conversions at a space velocity cf 5000 $h^{-1}$. The aforesaid mixture of gases was employed for these reactions. The conversions were calculated with the aforesaid equations.

EXAMPLES 2 AND 3

The procedure is identical to that specified with reference to Example 1, except that 640 g of $TiOSO_4$ are employed in Example 2 and 1600 g in Example 3.

EXAMPLE 4

A mixture of 400 g of AAB (step a in Example 1) is thoroughly kneaded with a solution of 106 g of ammonium metatungstate in 350 ml of water.

EXAMPLE 5

32 g of NH is added portion by portion to a solution of 52 g of oxalic-acid dihydrate in 350 ml of water and thoroughly kneaded with 475 g of AAB (step a in Example 1).

EXAMPLE 6

180 g of $TiOSO_4$ is stirred into a suspension of 400 g of AAB (step a in Example 1) in 5 l of water and neutralized with semiconcentrated ammonia. The solids are suctioned off, washed free of sulfate, and intimately mixed with a solution of 10.8 g of tungstic acid in 30 ml of semiconcentrated ammonia.

EXAMPLE 7

The procedure is identical to that in Example 6 except that 250 g of AAB, 450 g of $TiOSO_4$ and 270 g of tungstic acid are employed.

EXAMPLE 8

The procedure is identical to that in Example 6 except that 100 g of AAB, 720 g of $TiOSO_4$, and 43.2 g of tungstic acid are employed.

EXAMPLE 9

196 g of $TiOSO_4$ are stirred into a suspension of 400 g of AAB in 5 l of water. The batch is neutralized with ammonia, washed free of sulfates, and thoroughly kneaded with a solution obtained from 4.2 g of oxalic-acid dihydrate, 2.6 g of $NH_4VO_3$, and 50 ml of water.

EXAMPLE 10

The procedure is identical to that in Example 9 except that 250 g of AAB, 490 g of $TiOSO_4$, 10.2 g of oxalic-acid dihydrate, and 6.4 g of $NH_4VO_3$ are employed.

EXAMPLE 11

The procedure is identical to that in Example 9 except that 100 g of AAB, 784 g of $TiOSO_4$, 16.3 g of oxalic-acid dihydrate, and 10.2 g of NH are employed.

EXAMPLE 12

46 g of oxalic-acid dihidrate are dissolved in 350 ml of water. 25.6 g of $N_4VO_3$ are added portion by portion. 84.6 g of ammonium metatungstate and 400 g of AAB are added and the resulting paste kneaded.

EXAMPLE 13

450 g of AAB are treated with solutions obtained from 25.6 g of oxalic-acid dihydrate and 16 g of NH in 200 ml of water from 86.6 g of basic cerium nitrate in 170 ml of water, and intimately mixed.

EXAMPLE 14

130.5 g of $Zr(C_2O_4)_2.5H_2O$ are added to a solution of 25.6 g of oxalic-acid dihydrate and 16 g of $NH_4VO_3$ in 350 ml of water, and the batch is mixed with 450 g of AAB.

EXAMPLES 15 TO 23

The catalysts specified in Examples 15 through 23 are prepared as will now be specified in the proportions listed in the following table.

The $TiOSO_4$ is stirred into a suspension of AAB (step a in Example 1) in 5 l of water. The batch is neutralized with ammonia. The solids are suctioned-off, washed free of sulfates, dried for 15 hours at 120° C., and kneaded into a solution of tungstic acid in ammonia and into a solution obtained by reducing the ammonium metavanadate with a 1.6-fold excess of oxalic-acid dihidrate. The amounts of solvents were selected to ensure easy-to-knead pastes.

| Example | AAB (g) | Titanyl sulfate (g) | Tungstic acid (g) | Ammonium metavanadate (g) |
|---|---|---|---|---|
| 15 | 400 | 180 | 9.7 | 1.3 |
| 16 | 400 | 160 | 19.4 | 2.6 |
| 17 | 400 | 180 | 5.4 | 6.4 |
| 18 | 250 | 450 | 24.3 | 3.2 |
| 19 | 250 | 400 | 48.6 | 6.4 |
| 20 | 250 | 450 | 13.5 | 16.0 |
| 21 | 100 | 720 | 38.9 | 5.1 |
| 22 | 100 | 640 | 77.8 | 10.2 |
| 23 | 100 | 720 | 21.6 | 25.6 |

The percentage of the pore volume occupied by macropores with a diameter larger than 80 nm as determined by Hg porosimetry was 67.6% for the catalyst in Example 18. Values of the same order were obtained for the other catalysts.

EXAMPLE 24

400 g of AAB were thoroughly mixed with a solution of 75.6 g of tungstic acid in 300 ml of semiconcentrated ammonia. The resulting paste was dried for 15 hours at 120° C. and calcined for 3 hours at 500° C. It was then treated with a solution of 46.2 g of $Ce(OH)(NO_3)_3.3H_2O$ in 175 ml of water and then with the same volume of a solution obtained from 20.5 g of oxalic-acid dihydrate and 12.8 g of $NH_4VO_3$.

EXAMPLE 25

The catalyst was prepared as in Example 23 but with 69.6 g of zirconium-nitrate pentahydrate instead of the basic cerium nitrate.

EXAMPLES 26 AND 28

$TiOSO_4$ is stirred into a suspension of AAB (stage a in Example 1) and neutralized with ammonia. The solids are suctioned-off, washed free of sulfates, and thoroughly mixed with 400 ml of a solution obtained by adding basic cerium nitrate ("bas. ce. nit. hyd.") to a solution obtained from $NH_4VO_3$ and oxalic-acid dihydrate (1:1.6). The proportions of the starting materials are listed in the following table.

| Example | AAB (g) | Titanyl sulfate (g) | Bas. Ce nit. hyd. (g) | $NH_4$ metavanadate (g) |
|---|---|---|---|---|
| 26 | 400 | 184 | 13.9 | 2.6 |
| 27 | 250 | 460 | 34.7 | 6.4 |
| 28 | 100 | 736 | 55.4 | 10.2 |

EXAMPLES 29 TO 31

The catalyst pastes are obtained as specified with reference to Examples 26 through 28, except that the basic cerium nitrate is replaced with zirconium-nitrate hydrate (20.9 g in Example 29, 52.2 g in Example 30, and 83.5 g in Example 31), with the other constituents being employed in the same amounts, with Example 26 corresponding to Examples 29, 27 to 30, and 28 to 31.

TABLE I

| Layer silicate | Composition of the layer silicates | | | | | | | |
|---|---|---|---|---|---|---|---|---|
| | $SiO_2$ (%) | $Al_2O_3$ (%) | $Fe_2O_3$ (%) | CaO (%) | MgO (%) | $Na_2O$ (%) | $K_2O$ (%) | Ignition loss (%) |
| Crude bentonite from Example 1 (fuller's earth) | 54.4 | 15.5 | 6.1 | 5.9 | 4.5 | 0.3 | 1.8 | 11.5 |
| AAB* from Example 1 | 70.1 | 16.0 | 4.3 | 0.2 | 2.0 | 0.2 | 0.8 | 5.9 |
| Bentonite activated with $Na_2CO_3$ | 62.8 | 18.6 | 4.3 | 1.6 | 2.8 | 2.2 | 0.5 | 7.0 |
| Natural acidic clay | 60.9 | 19.1 | 5.4 | 0.7 | 3.7 | 0.2 | 1.05 | 7.4 |

*Acid-activated bentonite

TABLE II

Composition of catalysts and $NO_x$ conversions

| Example | Composition (%) | T (°C.) | $C_{NO}$ (%) | $C_{NO2}$ (%) |
|---|---|---|---|---|
| 1 | $TiO_2$ (20), AAB (80) | 300 | 49 | 80 |
| | | 350 | 88 | 100 |
| | | 400 | 87 | 100 |
| 2 | $TiO_2$ (50), AAB (50) | 300 | 51 | 80 |
| | | 350 | 90 | 100 |
| | | 400 | 84 | 100 |
| 3 | $TiO_2$ (80), AAB (20) | 300 | 61 | 90 |
| | | 350 | 92 | 100 |
| | | 400 | 83 | 100 |
| 4 | $WO_3$ (20), AAB (80) | 300 | 74 | 90 |
| | | 350 | 87 | 100 |
| | | 400 | 90 | 100 |
| 5 | $V_2O_5$ (5), AAB (95) | 250 | 38 | 70 |
| | | 300 | 68 | 100 |
| | | 350 | 82 | 100 |
| | | 400 | 82 | 100 |
| 6 | $WO_3$ (2), $TiO_2$ (18), AAB (80) | 300 | 63 | 80 |
| | | 350 | 94 | 100 |
| | | 400 | 89 | 100 |
| 7 | $WO_3$ (5), $TiO_2$ (45), AAB (50) | 300 | 57 | 90 |
| | | 350 | 96 | 100 |
| | | 400 | 91 | 100 |
| 8 | $WO_3$ (8), $TiO_2$ (72), AAB (20) | 300 | 62 | 90 |
| | | 350 | 97 | 100 |
| | | 400 | 93 | 100 |
| 9 | $V_2O_5$ (0.4), $TiO_2$ (19.6), AAB (80) | 300 | 75 | 100 |
| | | 350 | 92 | 100 |
| | | 400 | 90 | 100 |
| 10 | $V_2O_5$ (1), $TiO_2$ (49), AAB (50) | 250 | 86 | 100 |
| | | 300 | 94 | 100 |
| | | 350 | 94 | 100 |
| | | 400 | 92 | 100 |
| 11 | $V_2O_5$ (1.6), $TiO_2$ (78.4), AAB (20) | 250 | 92 | 100 |
| | | 300 | 95 | 100 |
| | | 350 | 94 | 100 |
| | | 400 | 89 | 100 |
| 12 | $V_2O_5$ (4), $WO_3$ (16), AAB (80) | 250 | 82 | 100 |
| | | 300 | 86 | 100 |
| | | 350 | 89 | 100 |
| | | 400 | 87 | 100 |
| 13 | $V_2O_5$ (2.5), $CeO_2$ (7.5), AAB (90) | 250 | 63 | 90 |
| | | 300 | 76 | 100 |
| | | 350 | 92 | 100 |
| | | 400 | 88 | 100 |
| 14 | $V_2O_5$ (2.5), $ZrO_2$ (7.5), AAB (90) | 300 | 64 | 90 |
| | | 350 | 80 | 100 |
| | | 400 | 80 | 100 |
| 15 | $V_2O_5$ (0.2), $WO_3$ (1.8), AAB (18) | 250 | 76 | 100 |
| | | 300 | 92 | 100 |
| | | 350 | 93 | 100 |
| | | 400 | 92 | 100 |
| 16 | $V_2O_5$ (0.4), $WO_3$ (3.6), $TiO_2$ (16), AAB (80) | 250 | 83 | 100 |
| | | 300 | 95 | 100 |
| | | 350 | 97 | 100 |
| | | 400 | 96 | 100 |
| 17 | $V_2O_5$ (1), $WO_3$ (1), $TiO_2$ (18), AAB (80) | 250 | 87 | 100 |
| | | 300 | 97 | 100 |
| | | 350 | 98 | 100 |
| | | 400 | 95 | 100 |
| 18 | $V_2O_5$ (0.5), $WO_3$ (4.5), $TiO_2$ (45), AAB (50) | 250 | 85 | 100 |
| | | 300 | 97 | 100 |
| | | 350 | 97 | 100 |
| | | 400 | 93 | 100 |
| 19 | $V_2O_5$ (1), $WO_3$ (9), $TiO_2$ (40), AAB (50) | 250 | 86 | 100 |
| | | 300 | 97 | 100 |
| | | 350 | 97 | 100 |
| | | 400 | 92 | 100 |
| 20 | $V_2O_5$ (2.5), $WO_3$ (2.5), $TiO_2$ (45), AAB (50) | 250 | 88 | 100 |
| | | 300 | 98 | 100 |
| | | 350 | 99 | 100 |
| | | 400 | 91 | 100 |
| 21 | $V_2O_5$ (0.8), $WO_3$ (7.3), $TiO_2$ (72), AAB (20) | 250 | 93 | 100 |
| | | 300 | 98 | 100 |
| | | 350 | 98 | 100 |
| | | 400 | 91 | 100 |
| 22 | $V_2O_5$ (1.6), $WO_3$ (14.4), $TiO_2$ (64), AAB (20) | 250 | 94 | 100 |
| | | 300 | 99 | 100 |
| | | 350 | 99 | 100 |
| | | 400 | 93 | 100 |
| 23 | $V_2O_5$ (4), $WO_3$ (4), $TiO_2$ (72), AAB (20) | 250 | 96 | 100 |
| | | 300 | 99 | 100 |
| | | 350 | 100 | 100 |
| | | 400 | 91 | 100 |
| 24 | $V_2O_5$ (2), $WO_3$ (14), $CeO_2$ (4), AAB (80) | 300 | 90 | 100 |
| | | 350 | 93 | 100 |
| | | 400 | 91 | 100 |
| 25 | $V_2O_5$ (2), $WO_3$ (14), $ZrO_2$ (4), AAB (80) | 300 | 86 | 100 |
| | | 350 | 90 | 100 |
| | | 400 | 88 | 100 |
| 26 | $V_2O_5$ (0.4), $CeO_2$ (1.2), $TiO_2$ (18.4), AAB (80) | 250 | 74 | 100 |
| | | 300 | 91 | 100 |
| | | 350 | 95 | 100 |
| | | 400 | 94 | 100 |
| 27 | $V_2O_5$ (1), $CeO_2$ (3), $TiO_2$ (46), AAB (50) | 250 | 79 | 100 |
| | | 300 | 95 | 100 |
| | | 350 | 96 | 100 |
| | | 400 | 94 | 100 |
| 28 | $V_2O_5$ (1.6), $CeO_2$ (4.8), $TiO_2$ (73.6), AAB (20) | 250 | 85 | 100 |
| | | 300 | 97 | 100 |
| | | 350 | 94 | 100 |
| | | 400 | 88 | 100 |
| 29 | $V_2O_5$ (0.4), $ZrO_2$ (1.2), $TiO_2$ (18.4), AAB (80) | 250 | 70 | 100 |
| | | 300 | 89 | 100 |
| | | 350 | 95 | 100 |
| | | 400 | 93 | 100 |
| 30 | $V_2O_5$ (1), $ZrO_2$ (3), $TiO_2$ (46), AAB (50) | 250 | 77 | 100 |
| | | 300 | 96 | 100 |
| | | 350 | 95 | 100 |
| | | 400 | 89 | 100 |
| 31 | $V_2O_5$ (1.6), $ZrO_2$ (4.8), $TiO_2$ (73.6), AAB (20) | 250 | 82 | 100 |
| | | 300 | 95 | 100 |
| | | 350 | 94 | 100 |
| | | 400 | 0 | 100 |

CONTROL EXAMPLES C1 to C8

Catalysts C1 to C8, analogous to the catalysts in Examples 15 and 18 ($V_2O_5$, $WO_3$, and $TiO_2$ plus either 80 or 50% AAB), but containing silicatic constituents not in accordance with the invention instead of the acid-activated bentonite (step a of Example 1), were prepared for purposes of comparison.

Table I illustrates the chemical composition of the silicatic constituents. That of the control catalysts is listed along with the resulting NO conversions in Table III. The same mixture of gases was employed.

The BET surfaces of the silicatic constituents employed for the control catalysts were
Crude bentonite (fuller's earth): 69 $m^2/g$
$Na_2CO_3$-activated bentonite: 41
Natural acidic clay: 83, and
Amorphous silicic acid 325.

The maximum conversions of nitrogen oxides can be plotted as a function of the percentage by weight of the particular silicatic constituent in terms of the results obtained with the same silicatic constituents without other oxidic catalyst constituents added. FIG. 1 clearly indicates that the catalysts in accordance with the invention are significantly more efficient.

The tests in accordance with Control Examples C1 to C6 demonstrate the necessity of acid activation. Catalysts manufactured with bentonite that was either unactivated (C1 & C2) or alkali-activated (C3 & C4) are just as unsatisfactory in terms of degree of NO conversion as a catalyst containing unactivated natural acidic clay (C5 & C6—comparable to an H-ion substituted clay). This is especially evident when the level of silicatic constituent is high.

The catalyst of Example 18 was also compared with a known catalyst with respect to the consumption of ammonia in reducing the $NO_x$. The known catalyst contained only the oxidic catalyst constituent with no acid-activated bentonite, in accordance with the formulation

| | |
|---|---|
| $V_2O_5$: | 1.0% by weight, |
| $WO_3$: | 9.0% by weight, |
| $TiO_2$: | 90.0% by weight. |

This catalyst was tested with the catalyst in accordance with the invention of Example 18 and with the same mixture of gases at a space velocity of 5000 $h^{-1}$. The percentage of ammonia supplied to the reactor and actually consumed in reducing the $NO_x$ was calculated from the balance of the converted reaction partner. FIG. 2 illustrates this percentage as a function of reactor temperature.

With the control catalyst, a considerable amount of the ammonia is oxidized by the oxygen in the flue gas and is accordingly no longer available to remove the $NO_x$ as desired. The catalyst in accordance with the invention on the other hand catalyzes the undesired oxidation of the ammonia as the result of oxygen to much less of an extent.

TABLE III

Composition of the control catalysts and No conversions

| Example | Silicatic constituent | $V_2O_5$ (%) | $WO_3$ (%) | $TiO_2$ (%) | $NO_x$ conversion (%) 300° C. | 350° C. | 400° C. |
|---|---|---|---|---|---|---|---|
| 18 | Acid-activated bentonite | 50 | 0.5 | 4.5 | 45 | 97 | 97 | 93 |
| 15 | " | 80 | 0.2 | 1.8 | 18 | 92 | 93 | 92 |
| C1 | Crude bentonite (fuller's earth) | 50 | 0.5 | 4.5 | 45 | 84 | 77 | 66 |
| C2 | " | 80 | 0.2 | 1.8 | 18 | 53 | 59 | 58 |
| C3 | $Na_2O_3$-activated bentonite | 50 | 0.5 | 4.5 | 45 | 60 | 64 | 59 |
| C4 | " | 80 | 0.2 | 1.8 | 18 | 31 | 38 | 38 |
| C5 | Natural acidic clay | 50 | 0.5 | 4.5 | 45 | 87 | 90 | 86 |
| C6 | " | 80 | 0.2 | 1.8 | 18 | 68 | 76 | 65 |
| C7 | Amorphous silicic acid | 50 | 0.5 | 4.5 | 45 | 94 | 95 | 92 |
| C8 | " | 80 | 0.2 | 1.8 | 18 | 26 | 43 | 47 |

It will be appreciated that the instant specification and claims are set forth by way of illustration and not limitation, and that various modifications and changes may be made without departing from the spirit and scope of the present invention.

What is claimed is:

1. A catalyst for decreasing the content of nitrogen oxides in flue gases comprising at least one metal selected from the group consisting of titanium, zirconium, vanadium, tungsten, molybdenum and cerium in the form of one or more of their oxides and a clay mineral silicate with a three-layer structure having interlayer cations, the three-layer structure being acid-activated, while partly retaining its crystalline layer structure, the three-layer silicate having a cation-exchange capacity of 30 mvals/100 g or more before acid activation, the acid activation lowering the concentration of interlayer cations and increasing the BET surface area at least 15% in terms of the BET surface area of the three-layer silicate before acid activation, and the atomic ratio of the silicon in the acid-activated three-layer silicate to the metal in the oxide is from 0.2 and 50.

2. A catalyst according to claim 1, wherein the increase of the BET surface area is at least 50% of the BET surface area of the three layer silicate before acid activation.

3. A catalyst according to claim 1, wherein the atom ratio of the silicon in the acid-activated three-layer silicate to the metal in the oxide is from 0.4 to 25.

4. A catalyst according to claim 1, wherein the acid activation is such so as to decrease the concentration of interlayer cations in the catalyst at least 12% relative to their concentration in the three-layer silicate before acid activation.

5. A catalyst according to claim 1, wherein the interlayer cations are selected from the group consisting of sodium, potassium, magnesium and calcium.

6. A catalyst according to claim 1, wherein the $SiO_2$ content of the acid-activated three-layer silicate is at least 5% higher than that of the starting material.

7. A catalyst according to claim 1, wherein the $SiO_2$ content of the acid-activated three-layer silicate is at least 10% higher than that of the starting material.

8. A catalyst according to claim 1, wherein macropores with a diameter of more than 80 nm account for at least 25% of the total volume of pores of the catalyst.

9. A catalyst according to claim 1, wherein the metal oxides are individually present in the following ranges of concentration $TiO_2$: 10-80% by weight,
$WO_3$ and/or $MoO_3$: 1-25% by weight,
$V_2O_5$: 0.1-25% by weight, and
$CeO_2$: 1-25% by weight, with the acid-activated three-layer silicate accounting for the rest of the active constituents.

10. A catalyst according to claim 1, wherein when present in a binary combination, the metal oxides are present in one of the following percentages by weight:

(a) ($TiO_2+V_2O_5$): 10-80,
(b) ($TiO_2+WO_3$ and/or $MoO_3$): 10-80,
(c) ($TiO_2+CeO_2$): 10-80,
(d) ($WO_3$ and/or $MoO_3+V_2O_5$): 5-25,
(e) ($CeO_2+V_2O_5$): 1-25, and
(f) ($ZrO_2+V_2O_5$): 1-25, with the acid-activated three-layer silicate accounting for the rest of the active constituents.

11. A catalyst according to claim 10, wherein the ratios between the weights of the metal oxides are (a) $V_2O_5:TiO_2=0.001-0.2$,
(b) $WO_3$ and/or $MoO_3: TiO_2=0.01-0.25$,
(c) $CeO_2:TiO_2=0.1-0.3$,
(d) $V_2O_5:WO_3$ and/or $MoO_3=0.1-2.5$,
(e) $V_2O_5:CeO_2=0.1-1.0$, and
(f) $V_2O_5:ZrO_2=0.1-1.0$.

12. A catalyst according to claim 1, wherein when present in a ternary combination, the metal oxides are present in one of the following percentages by weight:

(a) ($TiO_2+WO_3$ and/or $MoO_3+V_2O_5$): 10-80,
(b) ($TiO_2+CeO_2+V_2O_5$): 10-80,
(c) ($TiO_2+ZrO_2+V_2O_5$): 10-80,
(d) ($WO_3$ and/or $MoO_3+CeO_2+V_2O_5$): 10-25, and
(e) ($WO_3$ and/or $MoO_3+ZrO_2+V_2O_5$): 10-25, with the acid-activated three-layer silicate accounting for the rest of the active constituents.

13. A catalyst according to claim 12, wherein the ratios between the weights of the metal oxides present in the ternary combination are (a) $WO_3$ and/or $MoO_3: TiO_2=0.01-0.25$
$V_2O_5:TiO_2=0.01-0.11$,
(b) $CeO_2:TiO_2=0.05-0.23$,
$V_2O_5:TiO_2=0.01-0.11$,
(c) $ZrO_2:TiO_2=0.01-0.24$
$V_2O_5:TiO_2=0.01-0.11$,
(d) $CeO_2:WO_3$ and/or $MoO_3=0.1-5.0$,
$V_2O_5:WO_3$ and/or $MoO_3=0.1-2,5$, and
(e) $V_2O_5:WO_3$ and/or $MoO_3=0.1-2.5$,
$ZrO_2:WO_3$ and/or $MoO_3=0.1-10$.

14. A catalyst according to claim 1, wherein the catalyst is in the form of shaped bodies oblong or flat honeycombs, plates, rods, tubes, rings, wagon wheels or saddles.

15. A catalyst according to claim 1, wherein the catalyst is produced by impregnating the acid-activated three-layer silicate with a solution containing one or more of the metals in the form of salts and/or complex compounds and conducting calcination.

16. A catalyst according to claim 1, wherein the catalyst is produced by mechanically mixing the acid-activated three-layer silicate with an oxide or salt of one or more of the metals, impregnating the resultant mixture with a solution containing one or more of the metals in the form of salts and/or complex compounds, and conducting calcination.

17. A catalyst according to claim 1, wherein the catalyst is produced by precipitating or reprecipitating at least one compound containing one or more of the metals in the presence of a suspension of the acid-activated three-layer silicate, washing out the foreign ions, and calcining.

18. A catalyst according to claim 1, wherein the catalyst is produced by precipitating or reprecipitating at least one compound containing one or more of the metals in the presence of a mixture of suspensions of the acid-activated three-layer silicate and of an oxide or salt of one or more of the metals, washing out the foreign ions, and calcining.

* * * * *

UNITED STATES PATENT AND TRADEMARK OFFICE
CERTIFICATE OF CORRECTION

PATENT NO. : 4,722,918

DATED : February 2, 1988

INVENTOR(S) : Michael Schneider, et al.

It is certified that error appears in the above-identified patent and that said Letters Patent is hereby corrected as shown below:

| | |
|---|---|
| Col. 6, line 2 | Delete "2,5" and substitute --2.5-- |
| Col. 8, line 60 | Delete "cf" and substitute --of-- |
| Col. 9, lines 8, 50, and 60 | Delete "NH" and substitute --$NH_4VO_3$-- |
| Col. 14, line 1 under TABLE III | Delete "No" and substitute --NO-- |

Signed and Sealed this

Twenty-sixth Day of July, 1988

Attest:

DONALD J. QUIGG

Attesting Officer

Commissioner of Patents and Trademarks